(12) United States Patent
Park et al.

(10) Patent No.: US 8,934,549 B2
(45) Date of Patent: Jan. 13, 2015

(54) METHOD AND APPARATUS FOR ENCODING AND DECODING IMAGE BASED ON SKIP MODE

(75) Inventors: Sung-bum Park, Seongnam-si (KR); Jung-woo Kim, Seoul (KR); Dai-woong Choi, Seoul (KR); Jae-won Yoon, Seoul (KR); Jun-ho Cho, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 582 days.

(21) Appl. No.: 12/884,462

(22) Filed: Sep. 17, 2010

(65) Prior Publication Data

US 2011/0064131 A1    Mar. 17, 2011

Related U.S. Application Data

(60) Provisional application No. 61/243,216, filed on Sep. 17, 2009, provisional application No. 61/243,218, filed on Sep. 17, 2009, provisional application No. 61/244,139, filed on Sep. 21, 2009, provisional application No. 61/257,609, filed on Nov. 3, 2009.

(51) Int. Cl.
*H04N 7/12* (2006.01)
*H04N 11/02* (2006.01)
*H04N 11/04* (2006.01)
*G06K 9/40* (2006.01)
(Continued)

(52) U.S. Cl.
CPC ... *H04N 19/00127* (2013.01); *H04N 19/00278* (2013.01); *H04N 19/00018* (2013.01); *H04N 19/00545* (2013.01); *H04N 19/00272* (2013.01); *H04N 19/00121* (2013.01); *H04N 19/00442* (2013.01); *H04N 19/00775* (2013.01)

USPC ............. 375/240.2; 375/240.27; 375/240.16; 382/268

(58) Field of Classification Search
USPC ........................................ 375/240.2
See application file for complete search history.

(56) References Cited

U.S. PATENT DOCUMENTS 6,040,863 A * 3/2000 Kato ........................ 375/240.16
6,754,278 B1 * 6/2004 Suh et al. ................. 375/240.27
(Continued)

FOREIGN PATENT DOCUMENTS

CN      101321287 A    12/2008
CN      101415115 A    4/2009
(Continued)

OTHER PUBLICATIONS

International Search Report, dated May 13, 2011, issued in International Application No. PCT/KR2010/006422.
(Continued)

*Primary Examiner* — Hee-Yong Kim
(74) *Attorney, Agent, or Firm* — Sughrue Mion, PLLC

(57) ABSTRACT

A method and apparatus for decoding an image are provided. The method includes: decoding information representing that a first block of the image has been encoded in a first mode; and reconstructing the first block by setting pixel values of the first block to be identical with pixel values of a second block of the image that is adjacent to the first block and has been decoded prior to the first block, wherein the first mode is a mode for encoding information representing that the first block is identical or similar to the second block and has been encoded in the first mode, instead of encoding the pixel values of the first block.

19 Claims, 11 Drawing Sheets

(51) Int. Cl.
*H04N 19/132* (2014.01)
*H04N 19/176* (2014.01)
*H04N 19/103* (2014.01)
*H04N 19/46* (2014.01)
*H04N 19/174* (2014.01)
*H04N 19/13* (2014.01)
*H04N 19/34* (2014.01)
*H04N 19/60* (2014.01)

(56) References Cited

U.S. PATENT DOCUMENTS

| | | | |
|---|---|---|---|
| 7,903,873 | B2 | 3/2011 | Lu et al. |
| 8,750,377 | B2 | 6/2014 | Divorra Escoda et al. |
| 8,763,949 | B2 | 7/2014 | Thomassey |
| 2003/0113026 | A1 | 6/2003 | Srinivasan et al. |
| 2003/0169932 | A1 | 9/2003 | Li et al. |
| 2005/0135484 | A1 | 6/2005 | Lee et al. |
| 2005/0157800 | A1* | 7/2005 | Kim .................. 375/240.27 |
| 2007/0030911 | A1 | 2/2007 | Yoon |
| 2007/0133677 | A1 | 6/2007 | Han et al. |
| 2007/0160137 | A1 | 7/2007 | Guo et al. |
| 2008/0112481 | A1 | 5/2008 | Hsaing et al. |
| 2008/0130990 | A1 | 6/2008 | Moriya et al. |
| 2009/0097775 | A1* | 4/2009 | Monobe et al. ............ 382/268 |
| 2010/0220791 | A1 | 9/2010 | Lin et al. |

FOREIGN PATENT DOCUMENTS

| | | |
|---|---|---|
| CN | 101448162 A | 6/2009 |
| KR | 1999-0080293 A | 11/1999 |
| WO | 2007/069829 A1 | 6/2007 |
| WO | 2008/127597 A2 | 10/2008 |
| WO | 2009/036255 A2 | 3/2009 |
| WO | 2011027256 A1 | 3/2011 |

OTHER PUBLICATIONS

International Search Report, dated May 18, 2011, issued in International Application No. PCT/KR2010/006413.
International Search Report, dated May 18, 2011, issued in International Application No. PCT/KR2010/006404.
International Search Report, dated May 20, 2011, issued in International Application No. PCT/KR2010/006428.
International Search Report, dated Jun. 15, 2011, issued in International Application No. PCT/KR2010/006436.
Tanizawa, Akiyuki, et al., "Fast Rate-Distortion Optimized Coding Mode Decision for H.264", Electronics & Communications in Japan, Part III—Fundamentalelectronic Science, Wiley, Hoboken, NJ, US, Jan. 1, 2007, vol. 90, No. 9, pp. 41-55.
Laroche, Guillaume, et al., "RD Optimized Coding for Motion Vector Predictor Selection", IEEE Transactions on Circuits and Systems for Video Technology, IEEE Service Center, Piscataway, NJ, US, Dec. 1, 2008, vol. 17, No. 12, pp. 1681-1691.
Yanagihara, Naofumi, et al., "A Video Coding Scheme With a High Compression Ratio for Consumer Digital VCRs", Consumer Electronics, 1993, Digest of Technical Papers ICCE., International Conference on Rosemont, IL, Jun. 8-10, 1993, pp. 22-23.
Sjoberg, Rickard, et al., "Run-length Coding of Skipped Macroblocks", ITU Study Group 16—Video Coding Experts, Apr. 2, 2001, pp. 1-5.
Bjontegaard, Gisle, et al., "Use of Run-length Coding to Identify Coded Macroblocks", 13 VCEG Meeting, Apr. 2-4, 2001, Austin, TX, Videocoding Experts Goup of ITU-T SG.16, No. VCEG-M29, pp. 1-3.

Sullivan, Gary, et al., Meeting Report of the Thirteenth Meeting (Meeting M) of the ITU-T Q.6/16 Video Coding Experts Group (VCEG)—Austin, TX, Apr. 2-4, 2001, No. VCEG-M82d1, Jun. 15, 2001, 34 pages total.
Schwarz, Heiko, et al., "Skip Mode for SVC Slice Data Syntax", 19. JVT Meeting; Mar. 31-Apr. 7, 2006 Geneva, CH; (Joint Videoteam of ISO/IEC JTC1/SC9/WG11 and ITU-T SG.16), No. JVT-5068, Mar. 31, 2006, pp. 1-7.
Zeng, Wenjun, et al., "Rate Shaping by Block Dropping for Transmission of MPEG-precoded Video over Channels of Dynamic Bandwith", Proceedings of ACM Multimedia 96. Boston, Nov. 18-22, 1996, New York, ACM, Nov. 18, 1996, pp. 385-393.
Jo, Youngsub, et al., "Fast Mode Decision Algorithm Using Efficient Block Skip Techniques for H.264 P Slices", Advances in Multimedia, 2009. MMEDIA '09. First International Conference on IEEE, Piscataway, NJ. Jul. 20, 2009, pp. 92-97.
Lee, Bumshik, et al., "SVC NAL Unit Types for Online Extraction", 21. JVT Meeting; 78. MPEG Meeting; Oct. 20-27, 2006; Hangzhou, CN; (Joint Video Team of ISO/IEC JTC1/SC29/WG11 and ITU-T SG. 16), No. JVT-U080, Oct. 22, 2006, pp. 1-9.
Communication dated Feb. 1, 2013 issued by the European Patent Office in counterpart European Application No. 10817451.7.
Communication dated Mar. 5, 2013 issued by the European Patent Office in counterpart European Application No. 10817454.1.
Communication dated Mar. 25, 2013 issued by the European Patent Office in counterpart European Application No. 10817449.1.
Communication dated Apr. 4, 2013 issued by the European Patent Office in counterpart European Application No. 10817447.5.
Communication dated Jun. 7, 2013 issued by the European Patent Office in counterpart European Patent Application No. 10817441.8.
Communication dated Sep. 19, 2013 issued by the European Patent Office in counterpart European Patent Application No. 10817451.7.
Communication from the European Patent Office issued Jan. 2, 2014 in a counterpart European Application No. 10817454.1.
Communication from the European Patent Office issued Feb. 4, 2014 in a counterpart European Application No. 10817441.8.
Communication dated Apr. 14, 2014 issued by the State Intellectual Property Office of P.R. China in counterpart Chinese Patent Application No. 201080041699.6.
Communication dated Jun. 27, 2014 issued by the State Intellectual Property Office of P.R. China in counterpart Chinese Patent Application No. 201080041743.3.
Communication dated Apr. 15, 2014 issued by the State Intellectual Property Office of P.R. China in counterpart Chinese Patent Application No. 201080041744.8.
Communication dated Apr. 22, 2014 issued by the State Intellectual Property Office of P.R. China in counterpart Chinese Patent Application No. 201080041745.2.
Communication dated Jun. 3, 2014 issued by the Japanese Patent Office in counterpart Japanese Patent Application No. 2012-529682.
Communication dated Jun. 3, 2014 issued by the Japanese Patent Office in counterpart Japanese Patent Application No. 2012-529684.
Communication dated Jun. 3, 2014 issued by the Japanese Patent Office in counterpart Japanese Patent Application No. 2012-529686.
Communication dated Jun. 3, 2014 issued by the Japanese Patent Office in counterpart Japanese Patent Application No. 2012-529687.
Communication dated Jun. 3, 2014 issued by the Japanese Patent Office in counterpart Japanese Patent Application No. 2012-529688.
Sung-Bum Park, et al; "Novel context modeling scheme for lossless image compression using statistical reference"; Proceedings of the 6th International Symposium on Image and Signal Processing and Analysis; Sep. 16, 2009; pp. 250-253.

* cited by examiner

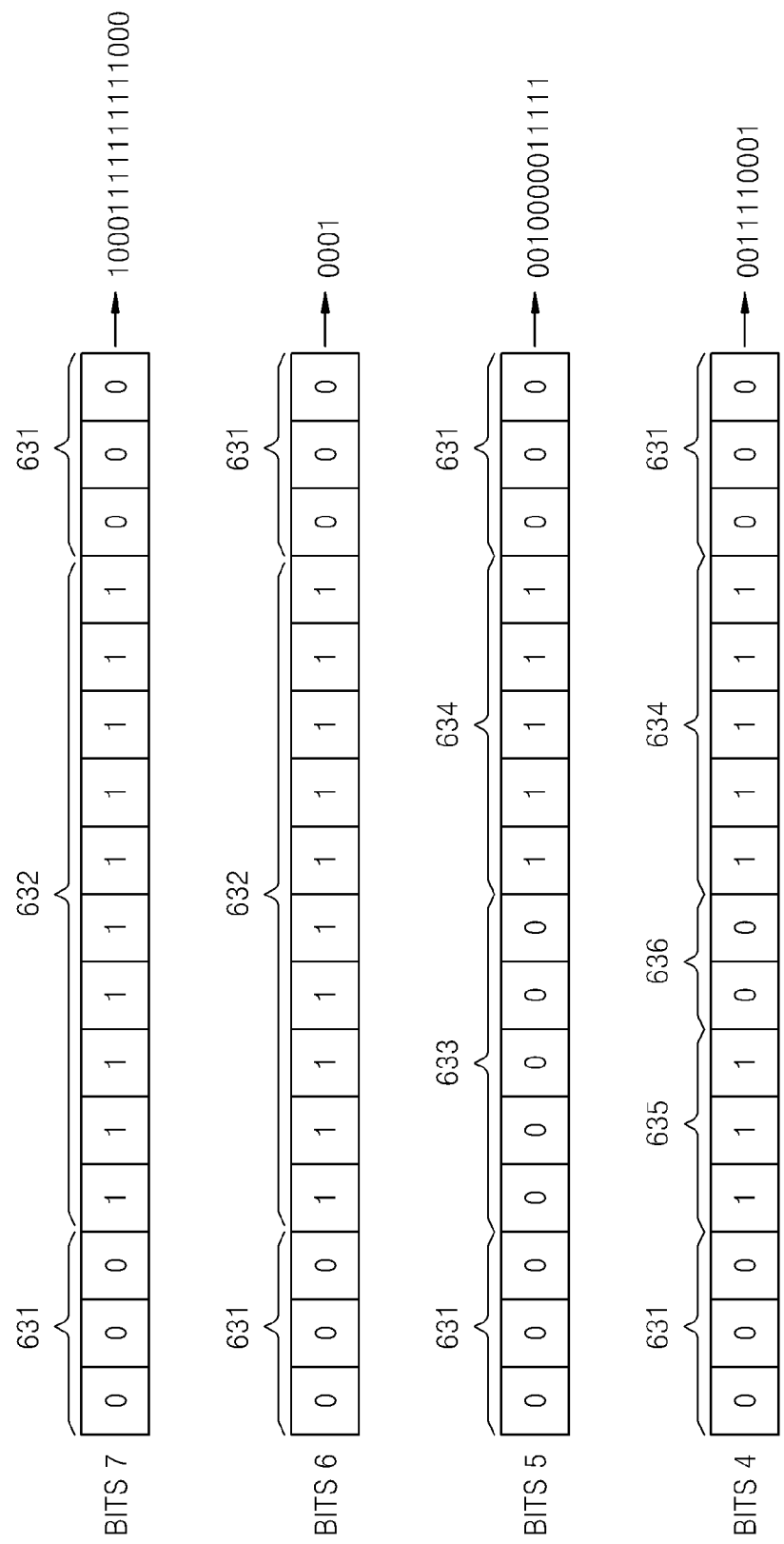

FIG. 15

```
skip_mode_post(){
    if {color_format==1) {
        unit=4
    } else {
        unit=3
    }
    for (i=0;i<nblocks;i++) {
        if (block_mode[i]==2) {
            if (i < unit) {
                for (j=0; j<64; j++) {
                    image_data[i*64 + j] = 0
                }
            } else {
                for (j=0;j<64; j++) {
                    image_data[i*64+j]=image_data[(i-unit)*64+j]
                }
            }
        }
    }
}
```

METHOD AND APPARATUS FOR ENCODING AND DECODING IMAGE BASED ON SKIP MODE

CROSS-REFERENCE TO RELATED PATENT APPLICATIONS

This application claims priority from U.S. Provisional Application No. 61/243,216 filed on Sep. 17, 2009, U.S. Provisional Application No. 61/243,218 filed on Sep. 17, 2009, U.S. Provisional Application No. 61/244,139 filed on Sep. 21, 2009, and U.S. Provisional Application No. 61/257,609 filed on Nov. 3, 2009, the disclosures of which are incorporated herein in their entireties by reference.

BACKGROUND

1. Field

Methods and apparatuses consistent with exemplary embodiments relate to decoding an image, and more particularly, to decoding an image based on a skip mode.

2. Description of the Related Art

As wireless networks develop, interconnection technologies between devices in a wireless network have become an issue such that many companies have tried to develop such technologies. In particular, an uncompressed high definition (HD) interconnection technology for replacing a high definition multimedia interface (HDMI) technology is being standardized in a wireless HD (WiHD) specification. According to the WiHD specification, various devices (such as televisions (TVs), home theaters, digital versatile disc (DVD) players, Blu-ray players, and camcorders) may be interconnected in a wireless network.

SUMMARY

Exemplary embodiments provide a method and apparatus for decoding an image in a skip mode, and a computer-readable record medium having recorded thereon a computer program for executing the method.

According to an aspect of an exemplary embodiment, there is provided an image decoding method including: decoding information representing that a first block of an image has been encoded in a first mode; and reconstructing the first block by setting pixel values of the first block to be identical with pixel values of a second block of the image, which is adjacent to the first block and has been decoded prior to the first block, based on the decoded information, wherein the first mode is a mode for encoding information representing that the first block is identical or similar to the second block and has been encoded in the first mode, instead of encoding the pixel values of the first block.

The second block may have been decoded in the first mode, a second mode, or a third mode, wherein the second block is encoded by performing discrete cosine transformation (DCT) in the second mode, and the second block is encoded based on a plurality of bit planes of pixel values in the third mode.

The reconstructing of the first block may include setting the pixel values of the first block to be identical with the pixel values of the second block with respect to each of a predetermined number of color components.

The reconstructing of the first block may include setting the pixel values of the first block to be identical with the pixel values of the second block which are disposed apart from the pixel values of the first block by differences between relative positions of the pixel values of the first block and the pixel values of the second block of the image, respectively.

The image data may be generated by arranging pixel values in an order in which a plurality of blocks of the image have been decoded and an order of the color components.

The differences between the relative positions of the pixel values of the first block and the pixel values of the second block, respectively, may be equal to a product of the predetermined number of the color components and a number of pixel values included in one block of the image.

The reconstructing of the first block may include setting all the pixel values of the first block to 0 when the first block is a first block of a current slice of the image.

The reconstructing of the first block may include setting all the pixel values of the first block to 0 with respect to each of the predetermined number of color components, when the first block is a first block of a current slice of the image.

According to an aspect of another exemplary embodiment, there is provided an image decoding apparatus including: a mode information decoder which decodes information representing that a first block of an image has been encoded in a first mode; and a skip mode decoder which reconstructs the first block by setting pixel values of the first block to be identical with pixel values of a second block of the image, which is adjacent to the first block and has been decoded prior to the first block, based on the decoded information, wherein the first mode is a mode for encoding information representing that the first block is identical or similar to the second block and has been encoded in the first mode, instead of encoding the pixel values of the first block.

According to an aspect of another exemplary embodiment, there is provided a computer-readable record medium having recorded thereon a computer program for executing the image decoding method.

According to an aspect of another exemplary embodiment, there is provided an image decoding method, the method including: reconstructing a first block of an image by setting pixel values of the first block to be identical with pixel values of a second block of the image, which is adjacent to the first block and has been decoded prior to the first block when an encoding mode of the first block is a first mode, wherein the first mode is a mode for encoding information representing that the first block is identical or similar to the second block and has been encoded in the first mode, instead of encoding the pixel values of the first block.

BRIEF DESCRIPTION OF THE DRAWINGS

The above and other aspects will become more apparent by describing in detail exemplary embodiments with reference to the attached drawings in which:

FIG. 5 is a block diagram of a natural mode encoder of an image encoding apparatus according to an exemplary embodiment of;

FIG. 6B is a diagram for describing a bit plane-based encoding method according to an exemplary embodiment;

FIG. 15 illustrates syntax for performing an image decoding method in a skip mode, according to an exemplary embodiment.

DETAILED DESCRIPTION OF EXEMPLARY EMBODIMENTS

Hereinafter, exemplary embodiments will be described in detail with reference to the attached drawings. Expressions such as "at least one of," when preceding a list of elements, modify the entire list of elements and do not modify the individual elements of the list.

Figure 1:
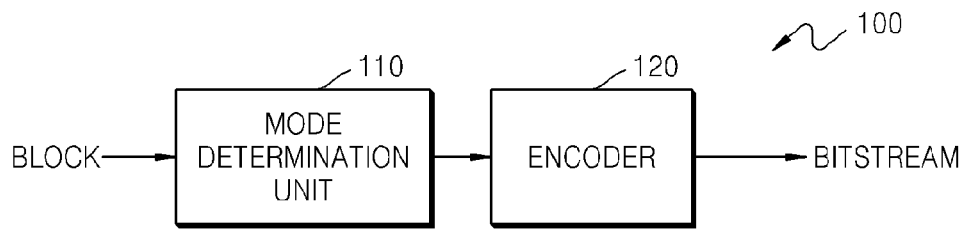
FIG. 1 is a block diagram of an image encoding apparatus according to an exemplary embodiment.

FIG. 1 is a block diagram of an image encoding apparatus 100 according to an exemplary embodiment. Referring to FIG. 1, the image encoding apparatus 100 includes a mode determination unit 110 and an encoder 120.

The mode determination unit 110 determines an encoding mode of a current block. Devices, such as TVs, home theaters, DVD players, Blu-ray players, mobile devices, personal and laptop computers, camcorders, etc., are interconnected in a wireless network to transmit and receive high quality contents equal to or above, for example, a high definition (HD) level. A standard for allowing interconnection between various devices is being established and characterized by a small memory and low complexity. Accordingly, complex image encoding methods (such as MPEG-1, MPEG-2, and MPEG-4 H.264/MPEG-4 Advanced Video Coding (AVC) methods) for increasing a compression ratio may not be used.

However, if an image is transmitted without compressing pixel values of the image, a wireless network having a high transmission rate is used such that interconnection between various devices may be interrupted. Accordingly, if an image is encoded and decoded as according to a skip mode, a natural mode, or a graphic mode to be described below, low complexity and an appropriate level of compression ratio may be ensured.

The skip mode is a mode for encoding a current block based on whether the current block is identical or similar to a neighboring block of the current block. The natural mode is a mode for encoding a current block by performing discrete cosine transformation (DCT) and bit plane splitting if the current block is a block of a natural image. The graphic mode is a mode for encoding a current block by performing bit plane splitting if the current block is a block of an artificial image such as a text image. The skip mode, the natural mode, and the graphic mode will be described in detail below with reference to FIGS. 3 through 5.

The mode determination unit 110 determines one of the above-mentioned modes to be used to encode the current block. For example, the mode determination unit 110 decides whether the current block is identical or similar to a neighboring block that is encoded prior to the current block in a current slice by comparing pixel values of the current block to pixel values of the neighboring block. Operations of the mode determination unit 110 according to one or more exemplary embodiments will be described in detail with reference to FIGS. 2 and 3.

Figure 2:
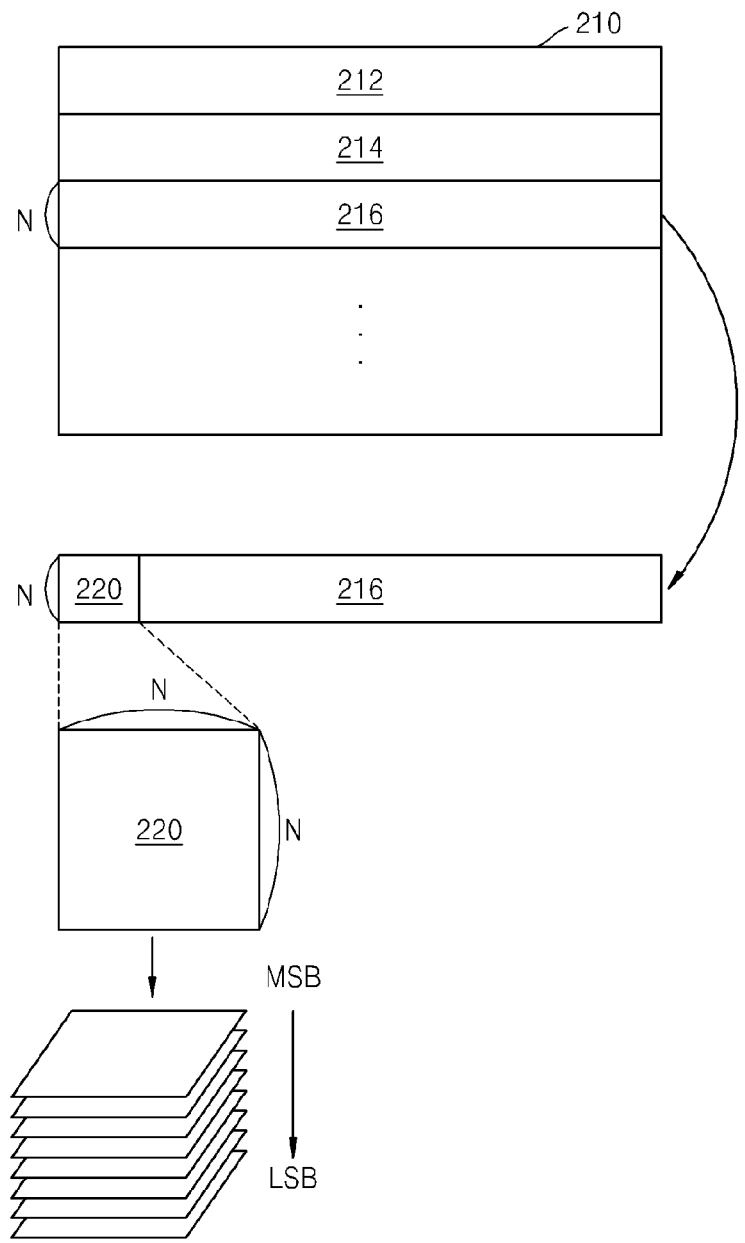
FIG. 2 is a diagram illustrating an operation of an image encoding apparatus according to an exemplary embodiment.

FIG. 2 is a diagram illustrating an operation of an image encoding apparatus 100 according to an exemplary embodiment. Referring to FIG. 2, the image encoding apparatus 100 encodes an image by splitting the image in units of slices, blocks, and bit planes. The image encoding apparatus 100 splits a current picture 210 into a plurality of slices 212 through 216 each having N rows of pixels, splits each of the slices 212 through 216 into N×N blocks 220, and splits each of the blocks 220 into a plurality of bit planes from a bit plane of most significant bits (MSBs) to a bit plane of least significant bits (LSBs). For example, if pixel values or DCT coefficients of a block 220 are represented by M bits, the block 220 may be split into M bit planes.

Figure 3:
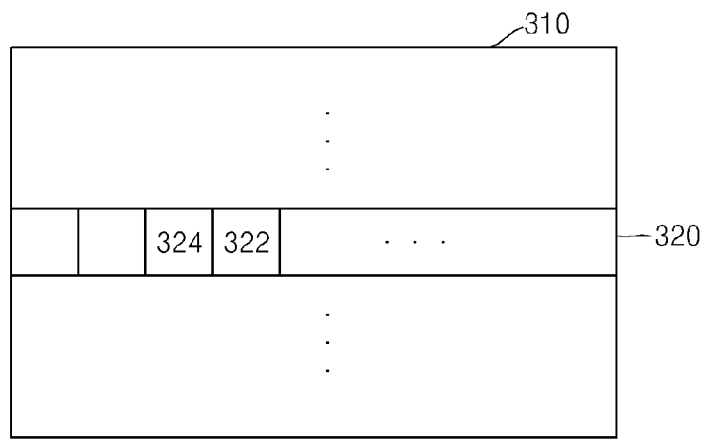
FIG. 3 is a diagram for describing a method of determining a skip mode, according to an exemplary embodiment.

FIG. 3 is a diagram for describing a method of determining a skip mode, according to an exemplary embodiment. Referring to FIG. 3, as described above with reference to FIG. 2, a current picture 310 may be split into a plurality of slices. A case when the image encoding apparatus 100 of FIG. 1 encodes a current slice 320 will be exemplarily described.

In order to encode a current block 322 of the current slice 320, the mode determination unit 110 of the image encoding apparatus 100 decides whether the current block 322 is identical or similar to a neighboring block 324 that is encoded prior to the current block 322. For example, the current block 322 may be identical or similar to the neighboring block 324 that is spatially adjacent to the current block 322. Accordingly, the mode determination unit 110 may determine an encoding mode of the current block 322 as the skip mode if the current block 322 is identical or similar to the neighboring block 324 that is to the left of the current block 322. The neighboring block 324 may be a block that is encoded immediately prior to the current block 322, though it is understood that another exemplary embodiment is not limited thereto.

Whether the current block 322 is identical or similar to the neighboring block 324 may be decided by using any of various methods. For example, a cost may be calculated based on at least one of a sum of absolute differences (SAD), a mean square error (MSE), a signal to noise ratio (SNR), a maximum difference between the current block 322 and the neighboring block 324, etc., and whether the current block 322 is identical or similar to the neighboring block 324 may be decided according to the calculated cost. If the SAD, the MSE, the SNR, or the maximum difference has or is close to a value of 0 or is less than or equal to a predetermined number, it may be decided that the current block 322 is identical or similar to the neighboring block 324.

The encoding mode of the current block 322 may be determined as the skip mode only when the mode determination unit 110 determines that the current block 322 is completely identical to the neighboring block 324, or when the mode determination unit 110 determines that the current block 322 is similar to the neighboring block 324. That is, the encoding mode of the current block 322 may be determined as the skip mode only when the SAD, the MSE, or the maximum difference has a value of 0, or when the SAD, the MSE, or the maximum difference is equal to or less than a predetermined threshold value such that it is determined that the current block 322 is similar to the neighboring block 324.

If it is determined that the encoding mode of the current block 322 is not the skip mode, then the mode determination unit 110 determines whether the encoding mode of the current block 322 is the natural mode or the graphic mode. If the current block 322 is a block of a natural image, i.e., a non-artificial image, the mode determination unit 110 determines the encoding mode of the current block 322 as the natural mode. If the current block 322 is a block of an artificial image, such as a text image or a computer graphic image, the mode determination unit 110 determines the encoding mode of the current block 322 as the graphic mode.

The method of deciding whether the current block 322 is a block of a natural image or a block of an artificial image is not restricted to that described above and any of various algorithms may be used. For example, since identical pixel values may be distributed in a certain region of an artificial image, pixel values of the current block 322 may be compared and, if the number of identical pixel values is equal to or greater than a predetermined number, it may be decided that the current block 322 is a block of an artificial image.

Furthermore, according to another exemplary embodiment, the current block 322 may be encoded individually in the natural mode and in the graphic mode, and the encoding mode of the current block 322 may be determined as the natural mode or the graphic mode based on rate distortion (RD) costs of the encoded blocks. A method using the RD costs will be described below with reference to FIG. 7.

Referring back to FIG. 1, if the mode determination unit 110 determines the encoding mode of the current block, the encoding unit 120 encodes the current block in the encoding mode determined by the mode determination unit 110.

If the current block is identical or similar to the neighboring block such that the encoding mode of the current block is determined as the skip mode, the encoding unit 120 encodes information, e.g., flag information, representing that the current block is encoded in the skip mode, instead of encoding the pixel values of the current block.

Since flag information of one bit may be encoded instead of encoding all of the pixel values of the current block, an image compression ratio is improved. Also, since only the neighboring block that is encoded prior to the current block is referred to in order to encode the current block in the skip mode, the skip mode requires low complexity.

If the current block is not identical or similar to the neighboring block such that the encoding mode of the current block is not determined as the skip mode, the encoding unit 120 encodes the current block in the natural mode or the graphic mode. If the mode determination unit 110 determines the encoding mode of the current block as the natural mode, the encoding unit 120 encodes the current block in the natural mode. If the mode determination unit 110 determines the encoding mode of the current block as the graphic mode, the encoding unit 120 encodes the current block in the graphic mode. Encoding methods in the natural mode and the graphic mode according to one or more exemplary embodiments will be described in detail with reference to FIGS. 4, 5, 6A and 6B.

Figure 4:
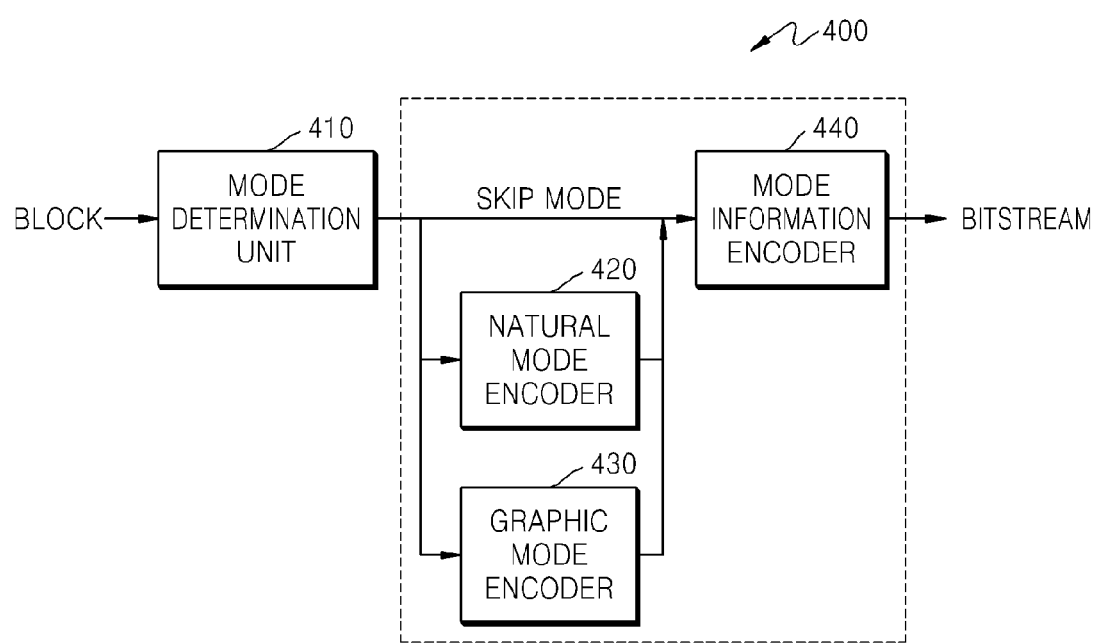
FIG. 4 is a block diagram of an image encoding apparatus according to another exemplary embodiment.

FIG. 4 is a block diagram of an image encoding apparatus 400 according to another exemplary embodiment. Referring to FIG. 4, the image encoding apparatus 400 includes a mode determination unit 410, a natural mode encoder 420, a graphic mode encoder 430, and a mode information encoder 440. The mode determination unit 410 may correspond to the mode determination unit 110 illustrated in FIG. 1, and the natural mode encoder 420, the graphic mode encoder 430, and the mode information encoder 440 may correspond to the encoding unit 120 illustrated in FIG. 1.

The mode determination unit 410 may determine an encoding mode of a current block from among the skip mode, the natural mode, and the graphic mode.

If the mode determination unit 410 determines the encoding mode of the current block as the skip mode, the mode information encoder 440 encodes information, e.g., flag information, representing that the current block is encoded in the skip mode instead of encoding pixel values of the current block.

If the mode determination unit 410 determines the encoding mode of the current block as the natural mode, the natural mode encoder 420 encodes the current block in the natural mode by performing DCT on the current block to generate DCT coefficients, separating the generated DCT coefficients into a plurality of bit planes, and encoding each of the bit planes by using a bit plane-based encoding method. An encoding method in a natural mode according to an exemplary embodiment will now be described in detail with reference to FIG. 5.

Figure 5:
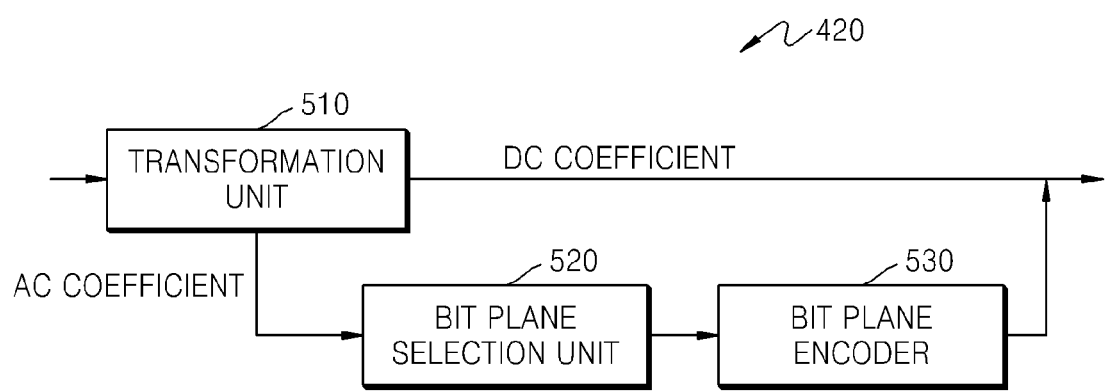

FIG. 5 is a block diagram of a natural mode encoder 420 of an image encoding apparatus 400 according to an exemplary embodiment. Referring to FIG. 5, the natural mode encoder 420 includes a transformation unit 510, a bit plane selection unit 520, and a bit plane encoder 530.

The transformation unit 510 performs DCT on a current block to generate DCT coefficients. DCT is only an exemplary method of transforming pixel values of the pixel domain to the frequency domain and generating frequency domain coefficients, and one of ordinary skill in the art will easily understand that any other method may be used to transform the current block in another exemplary embodiment.

From among the DCT coefficients generated when the transformation unit 510 performs DCT on the current block, bitstreams of direct current (DC) coefficients are constantly maintained. However, alternating current (AC) coefficients are encoded by using a bit plane-based encoding method.

The bit plane selection unit 520 separates the AC coefficients into a plurality of bit planes from a bit plane of MSBs to a bit plane of LSBs. M-bit AC coefficients are separated in units of bits to generate M bit planes. A first bit plane of the MSBs in bitstreams of the AC coefficients is generated, and a second bit plane of second MSBs in the bitstreams is generated. This operation is repeated to the LSBs to generate the M bit planes.

When the bit plane selection unit 520 generates the bit planes, the bit plane encoder 530 encodes each of the generated bit planes by using a bit plane-based encoding method. A method of encoding the bit planes is not restrictive and any bit plane-based encoding method may be used. Also, according to an exemplary embodiment, each of the bit planes may be encoded by using a bit mask. A region having significant bits may be set in each of the bit planes by using a bit mask, and bit plane-based encoding may be performed on only the set region.

It is understood that the method of separately encoding the DC coefficients and the AC coefficients described above is exemplarily described and the natural mode encoder 420 may use any method of encoding the current block by performing DCT and by using a bit plane-based encoding method.

Referring back to FIG. 4, if the mode determination unit 410 determines the encoding mode of the current block as the graphic mode, the graphic mode encoder 430 encodes the current block in the graphic mode by separating the pixel values of the current block into a plurality of bit planes and encoding each of the bit planes by using a bit plane-based encoding method. An encoding method in a graphic mode according to one or more exemplary embodiments will now be described in detail with reference to FIGS. 6A and 6B.

Figure 6A:
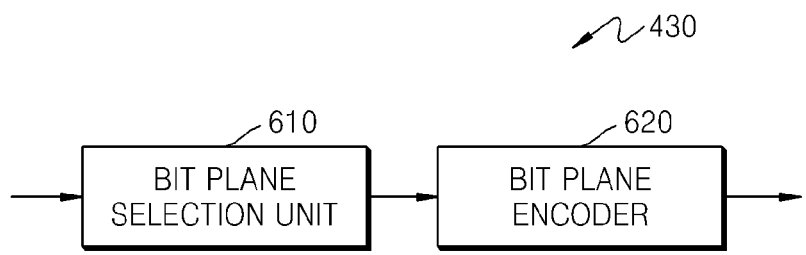
FIG. 6A is a block diagram of a graphic mode encoder of an image encoding apparatus illustrated according to an exemplary embodiment.

FIG. 6A is a block diagram of a graphic mode encoder 430 of an image encoding apparatus according to an exemplary embodiment. Referring to FIG. 6A, the graphic mode encoder 430 includes a bit plane selection unit 610 and a bit plane encoder 620.

The bit plane selection unit 610 separates pixel values of a current block into a plurality of bit planes. For example, P-bit pixel values are separated in units of bits from a bit plane of MSBs to a bit plane of LSBs such that P bit planes are generated.

When the bit plane selection unit 610 generates the bit planes, the bit plane encoder 620 encodes each of the generated bit planes by using a bit plane-based encoding method.

FIG. 6B is a diagram for describing a bit plane-based encoding method according to an exemplary embodiment. Referring to FIG. 6B, the bit plane encoder 620 encodes a bit plane by grouping identical bit values. A case when a current block has a size of 4×4 and 8-bit pixel values will be exemplarily described. The bit plane encoder 620 encodes a bit plane of bits 7 that are MSBs as illustrated in FIG. 6B. The bit plane of bits 7 is encoded by separating a group 631 having a value of 0 from a group 632 having a value of 1. Since the bit plane of bits 7 is divided into the groups 631 and 632 according to a bit value, a value of 1 is encoded and a value of 000111111111000 representing individual bits of the groups 631 and 632 is encoded.

A bit plane of bits 6 is encoded based on whether each of the groups 631 and 632 in the bit plane of bits 7 is split into groups having different bit values. In FIG. 6B, since both the group 631 having a value of 0 and the group 632 having a value of 1 are not split, a value of 00 representing that the group 631 having a value of 0 is not split and a value of 01 representing the group 632 having a value of 1 is not split are encoded.

In a bit plane of bits 5, the group 632 having a value of 1 in the bit plane of bits 6 is split into two groups 633 and 634. Accordingly, a value of 00 representing that the group 631 having a value of 0 is not split is encoded, and a value of 1 representing that the group 632 having a value of 1 is split is encoded. Moreover, a value of 0000011111 representing individual bits of the groups 634 and 644 split from the group 632 having a value of 1 is encoded.

In a bit plane of bits 4, the group 633 having a value of 0, which is split from the group 632 having a value of 1, is split into two groups 635 and 636. Accordingly, a value of 00 representing that the group 631 having a value of 0 is not split is encoded. Also, a value of 1 representing that the group 633 having a value of 0, which is split from the group 632 having a value of 1, is split is encoded, and a value of 11100 representing individual bits of the groups 635 and 636 split from the group 633 is encoded. Furthermore, a value of 01 representing that the group 634 having a value of 1 is not split is encoded.

The bit plane encoder 620 encodes every bit plane to a bit plane of LSBs by repeatedly performing a bit plane-based encoding method based on bit groups generated by grouping identical bit values as described above.

Referring back to FIG. 4, the mode information encoder 440 encodes information representing the encoding mode of the current block. If the mode determination unit 410 determines the encoding mode of the current block as the skip mode, the mode information encoder 440 encodes information, e.g., flag information, representing that the current block is encoded in the skip mode.

If the mode determination unit 410 determines the encoding mode of the current block as the natural mode or the graphic mode, as in the skip mode, the mode information encoder 440 encodes information, e.g., flag information, representing that the current block is encoded in the natural mode or the graphic mode.

Also, the mode information encoder 440 may encode information, e.g., flag information, representing whether a current slice including the current block includes blocks encoded in the skip mode, the natural mode, or the graphic mode. The flag information representing the current slice may be a syntax element of the current slice.

Figure 7:
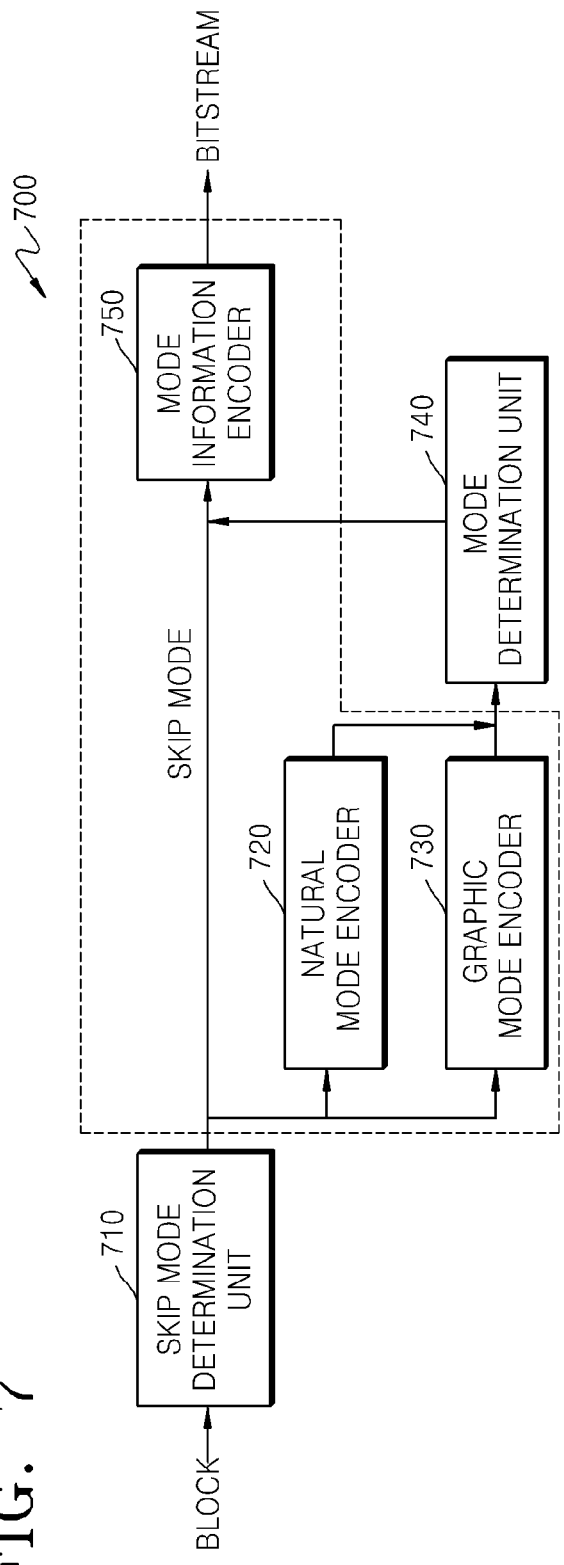
FIG. 7 is a block diagram of an image encoding apparatus according to another exemplary embodiment.

FIG. 7 is a block diagram of an image encoding apparatus 700 according to another exemplary embodiment. Referring to FIG. 7, the image encoding apparatus 700 includes a skip mode determination unit 710, a natural mode encoder 720, a graphic mode encoder 730, a mode determination unit 740, and a mode information encoder 750.

The skip mode determination unit 710 and the mode determination unit 740 may correspond to the mode determination unit 110 illustrated in FIG. 1, and the natural mode encoder 720, the graphic mode encoder 730, and the mode information encoder 750 may correspond to the encoding unit 120 illustrated in FIG. 1.

The skip mode determination unit 710 determines whether to encode a current block in the skip mode. For example, the skip mode determination unit 710 compares pixel values of the current block to pixel values of a neighboring block that is encoded prior to the current block, and determines the encoding mode of the current block as the skip mode if the current block is identical or similar to the neighboring block.

If the skip mode determination unit 710 determines the encoding mode of the current block as the skip mode, the mode information encoder 750 encodes information, e.g., flag information, representing that the current block is encoded in the skip mode.

If the skip mode determination unit 710 does not determine the encoding mode of the current block as the skip mode, the natural mode encoder 720 and the graphic mode encoder 730 respectively encode the current block in the natural mode and the graphic mode.

The mode determination unit 740 compares the blocks encoded by the natural mode encoder 720 and the graphic mode encoder 730, and determines whether to encode the current block in the natural mode or the graphic mode. For example, the mode determination unit 740 calculates RD costs based on a result of encoding the current block in the natural mode and a result of encoding the current block in the graphic mode, according to the equation: cost=(rate)+(lambda)×(distortion). Accordingly, the mode determination unit 740 determines one of the natural mode and the graphic mode that has a lower cost as the encoding mode of the current block. A value of lambda may be variably set according to an exemplary embodiment, and a reference value for selecting the natural mode or the graphic mode may be changed by adjusting the value of lambda.

If the mode determination unit 740 determines the encoding mode of the current block as the natural mode or the graphic mode, the mode information encoder 750 encodes information, e.g., flag information, representing that the current block is encoded in the natural mode or the graphic mode.

Also, as described above with reference to FIG. 6, further to the encoding of the information representing the encoding mode of the current block, the mode information encoder 750 may encode information representing whether a current slice includes blocks encoded in the skip mode, the natural mode, or the graphic mode.

Figure 8:
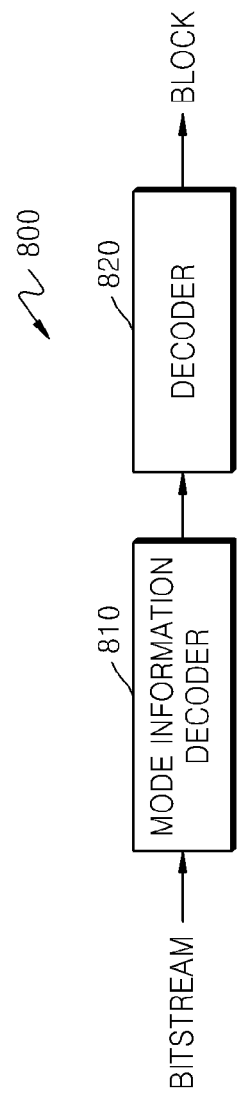
FIG. 8 is a block diagram of an image decoding apparatus according to an exemplary embodiment.

FIG. 8 is a block diagram of an image decoding apparatus 800 according to an exemplary embodiment. Referring to FIG. 8, the image decoding apparatus 800 includes a mode information decoder 810 and a decoder 820.

The mode information decoder 810 decodes information representing an encoding mode of a current block, which is included in a bitstream. For example, the mode information decoder 810 decodes information representing whether the current block is encoded in the skip mode, the natural mode, or the graphic mode, by parsing the bitstream.

The decoder 820 decodes the current block based on the information decoded by the mode information decoder 810. If the decoded information represents that the current block is encoded in the skip mode, the decoder 820 restores the current block based on a block that is identical or similar to the current block, i.e., a neighboring block decoded prior to the current block. The neighboring block may be a block that is decoded immediately prior to the current block, though it is understood that another exemplary embodiment is not limited thereto. If the decoded information represents that the current block is encoded in the natural mode or the graphic mode, the decoder 820 restores the current block by inversely performing the encoding operations described above with reference to FIGS. 5 and 6A. A decoding method of the current block according to an exemplary embodiment will be described in detail with reference to FIG. 9.

Figure 9:
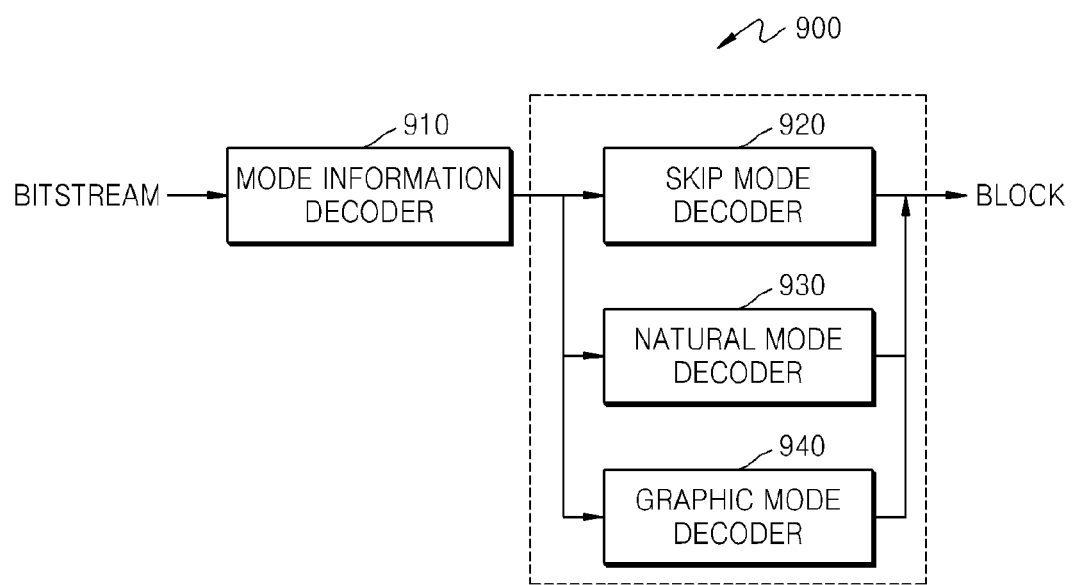
FIG. 9 is a block diagram of an image decoding apparatus according to another exemplary embodiment.

FIG. 9 is a block diagram of an image decoding apparatus 900 according to another exemplary embodiment. Referring to FIG. 9, the image decoding apparatus 900 includes a mode information decoder 910, a skip mode decoder 920, a natural mode decoder 930, and a graphic mode decoder 940. The mode information decoder 910 may correspond to the mode information decoder 810 illustrated in FIG. 8, and the skip mode decoder 920, the natural mode decoder 930, and the graphic mode decoder 940 may correspond to the decoder 820 illustrated in FIG. 8.

The mode information decoder 910 decodes information representing an encoding mode of a current block, which is included in a bitstream.

The skip mode decoder 920 decodes the current block in the skip mode if the decoded information represents that the current block is encoded in the skip mode. The skip mode decoder 920 restores the current block based on a neighboring block decoded prior to the current block. In this case, the current block may be restored by directly copying a neighboring block of the same slice to which the current block belongs. Furthermore, the neighboring block may be decoded immediately prior to the current block. Also, the neighboring block may be decoded in the skip mode, the natural mode, or the graphic mode, immediately prior to the current block.

The skip mode decoder 920 may restore the current block 322 by setting pixel values of the current block 332 to be identical with those of the neighboring block 324 that is decoded immediately prior to the current block 322, though it is understood that another exemplary embodiment is not limited thereto.

Figure 13:
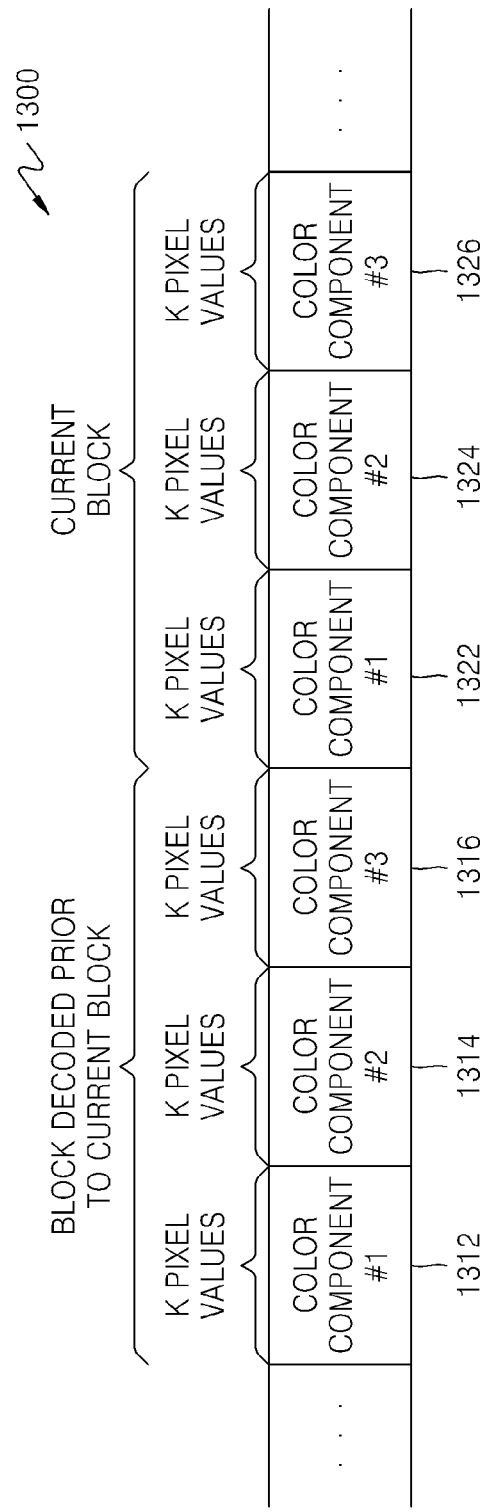
FIG. 13 is a diagram for describing an image decoding method in a skip mode, according to an exemplary embodiment.
Figure 14:
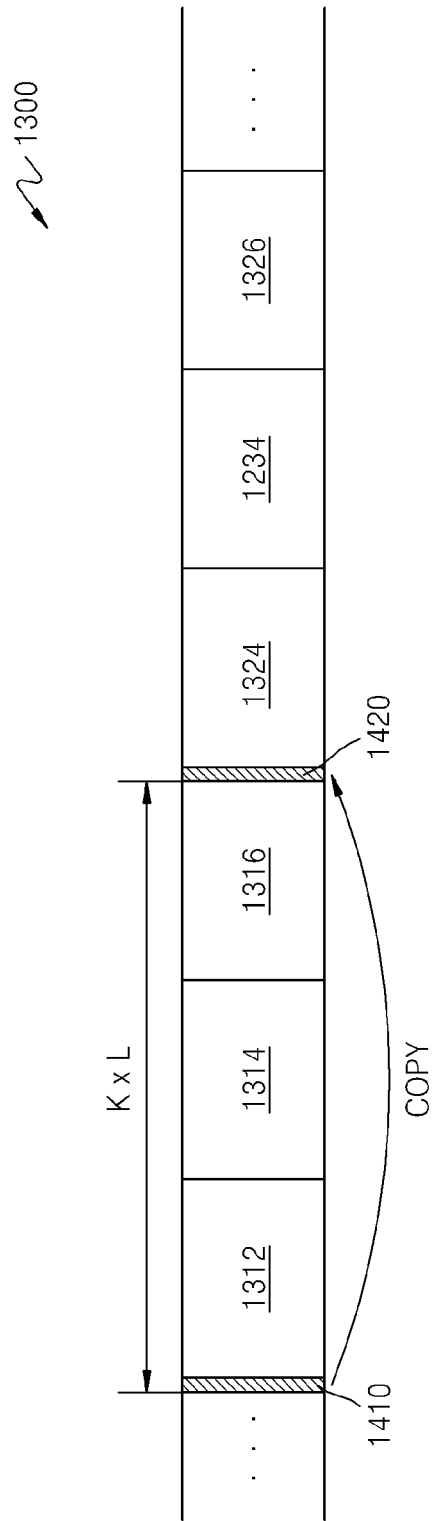
FIG. 14 is a diagram for describing an image decoding method in a skip mode, according to another exemplary embodiment.

If an image encoding apparatus and an image decoding apparatus perform encoding and decoding based on a color space including L color components, respectively, then the pixel values of the current block 332 are set to be identical with those of the neighboring block 324 with respect to each of the L color components (see FIGS. 13 to 15 for more details).

FIG. 13 is a diagram for describing an image decoding method in a skip mode, according to an exemplary embodiment. Referring to FIGS. 9 and 13, the skip mode decoder 920 may reconstruct a current block by directly copying pixel values of a neighboring block, which is decoded prior to the current block, from among decoded image data 1300. The decoded image data 1300 is generated by arranging decoded pixel values according to an order in which a plurality of blocks have been decoded and an order of color components.

From among the pixel values of the current block, pixel values 1322 regarding a color component #1 are set to be identical with pixel values 1312 of the neighboring block, pixel values 1324 regarding a color component #2 are set to be identical with pixel values 1314 of the neighboring block, and pixel values 1326 regarding a color component #3 are set to be identical with pixel values 1316 of the neighboring block.

FIG. 13 illustrates a case where an image encoding apparatus and an image decoding apparatus perform encoding and decoding based on a color space including three color components, respectively. However, the number of color components may vary according to various exemplary embodiments. For example, when encoding and decoding are performed based on a color space including four color components in another exemplary embodiment, a current block may also be decoded in the skip mode as described above with reference to FIG. 13. In FIG. 13, K denotes the number of pixel values included in each block. If encoding and decoding are performed on a basis of an 8×8 block, then K is 64.

FIG. 14 is a diagram for describing an image decoding method in a skip mode, according to another exemplary embodiment. Referring to FIGS. 9 and 14, the skip mode decoder 920 may reconstruct pixel values 1322, 1324, and 1326 of a current block, based on differences between relative positions of the pixel values 1322, 1324, and 1326 of the current block and relative positions of pixel values 1312, 1314, and 1316 of a neighboring block, which is decoded prior to the current block, in decoded image data 1300.

In the decoded image data 1300, a first pixel value 1420 of a color component #1 of the current block and a first pixel value 1410 of a color component #1 of the neighboring block are disposed apart from each other by K×L. Since the decoded image data 1300 is generated by arranging pixel values according to an order in which a plurality of blocks have been decoded and an order of color components, the differences between the relative positions of the pixel values 1322, 1324, and 1326 of the current block and the relative positions of pixel values 1312, 1314, and 1316 of the neighboring block, respectively, are equal to a product of the number of pixel values included in each block and the number of the color components.

Accordingly, the pixel values 1322, 1324, and 1326 of the current block may be reconstructed by setting the pixel values 1322, 1324, and 1326 of the current block to be identical with the pixel values 1312, 1314, and 1316 of the neighboring block that are disposed apart from the pixel values 1322, 1324, and 1326 of the current block by K×L, respectively.

FIG. 15 illustrates syntax for performing an image decoding method in a skip mode, according to an exemplary embodiment. Referring to FIG. 15, "unit" denotes a number of color components. First, it is determined whether a color space including three color components or a color space including four color components has been used to encode a current block. Next, pixel values of the current block are reconstructed by using a loop of "for (i=0; i<nblocks; i++)."

The pixel values of the current block are set to be identical with those of a neighboring block, which is decoded prior to the current block, only when "block_mode[i]=2," that is, only when the current block has been encoded in the skip mode.

If the current block is a first block of a current slice, then a neighboring block that is decoded prior to the current block and the pixel values of which may be copied to reconstruct the current block, is not present. Thus, all the pixel values of the current block are set to 0, based on "for (j=0; j<64; J++)

{image_data[i×64+j]=0}." Here, 64 denotes the number of pixel values included in each block. Since all the pixel values of the current block should be set to 0 with respect to each of L color components, a loop of setting all the pixels of the current block is repeatedly performed until i<unit.

If the current block is not a first block of the current slice, then copying of pixels is repeatedly performed, based on "for (j=0; j<63; j++) {image_data[i×64+j]=image_data[(j−unit)×64=j]}."

Referring back to FIG. 9, the natural mode decoder 930 decodes the current block in the natural mode if the decoded information represents that the current block is encoded in the natural mode. The natural mode decoder 930 parses DC coefficients from among DCT coefficients included in the bitstream, and restores a plurality of bit planes of AC coefficients from among the DCT coefficients, by using a bit plane-based decoding method. If the AC coefficients are restored by combining the restored bit planes, inverse DCT (IDCT) is performed based on the restored AC coefficients and the parsed DC coefficients. As such, the current block is restored.

The graphic mode decoder 940 decodes the current block in the graphic mode if the decoded information represents that the current block is encoded in the graphic mode. The graphic mode decoder 940 restores a plurality of bit planes of pixel values of the current block by using a bit plane-based decoding method, and restores the pixel values of the current block by combining the restored bit planes.

Figure 10:
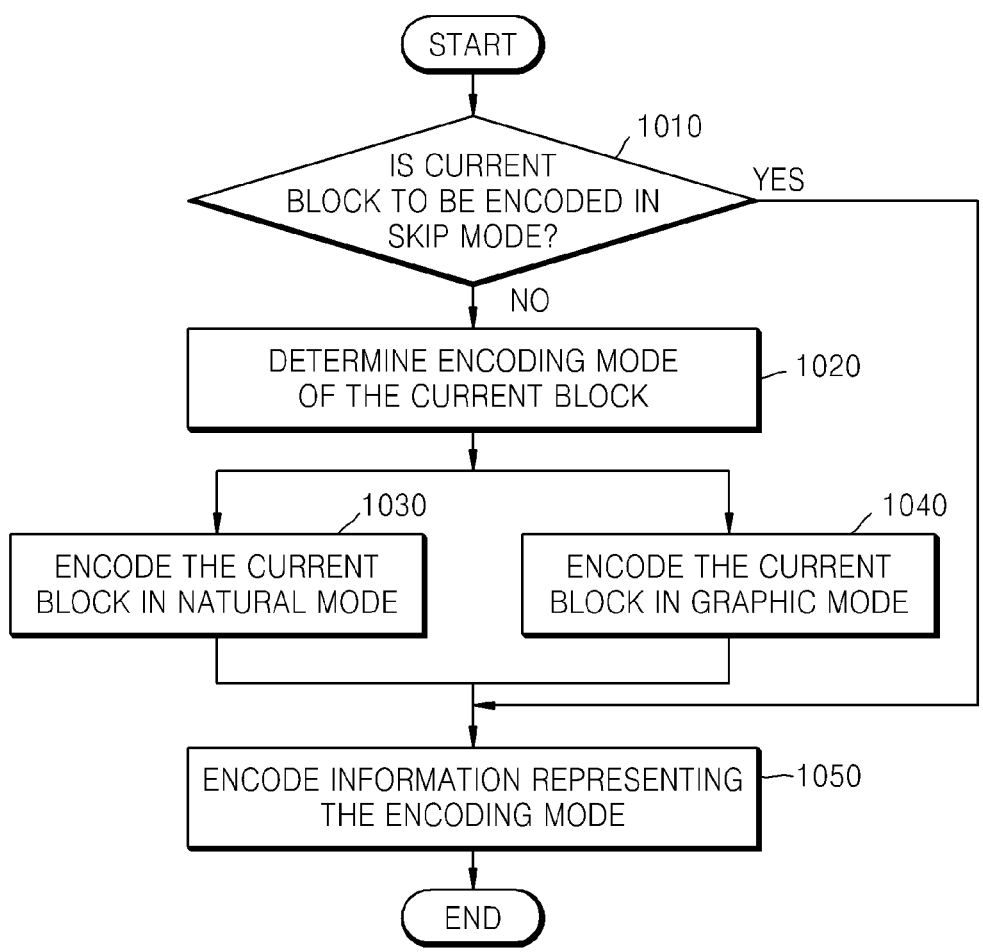
FIG. 10 is a flowchart of an image encoding method according to an exemplary embodiment.

FIG. 10 is a flowchart of an image encoding method according to an exemplary embodiment. Referring to FIG. 10, in operation 1010, the image encoding apparatus 100 or 400 illustrated in FIG. 1 or 4 determines whether to encode a current block in the skip mode. The skip mode is a mode for encoding information representing that the current block is encoded in the skip mode, instead of encoding pixel values of the current block, when the current block is identical or similar to a neighboring block of the current block.

If it is determined in operation 1010 that the encoding mode of the current block is not the skip mode, in operation 1020, the image encoding apparatus 100 or 400 determines whether to encode the current block in the natural mode or the graphic mode. As described above with reference to the mode determination unit 110 illustrated in FIG. 1, the encoding mode of the current block may be determined as the natural mode or the graphic mode based on whether the current block is a block of a natural image or a block of an artificial image.

In operation 1030, the image encoding apparatus 100 or 400 encodes the current block in the natural mode if it is determined in operation 1020 that the current block is a block of a natural image, the current block is encoded in the natural mode. An encoding method in a natural mode according to an exemplary embodiment has been described above with reference to FIG. 5.

In operation 1040, the image encoding apparatus 100 or 400 encodes the current block in the graphic mode if it is determined in operation 1020 that the current block is a block of an artificial image. An encoding method in a graphic mode according to an exemplary embodiment has been described above with reference to FIG. 6A.

In operation 1050, the image encoding apparatus 100 or 400 encodes information representing the encoding mode of the current block. If the encoding mode of the current block is determined as the skip mode in operation 1010, the image encoding apparatus 100 or 400 encodes information, e.g., flag information, representing that the current block is encoded in the skip mode, instead of encoding the pixel values of the current block. Also, if the encoding mode of the current block is not determined as the skip mode in operation 1010 and the current block is encoded in the natural mode or the graphic mode in operation 1030 or 1040, then the image encoding apparatus 100 or 400 encodes information, e.g., flag information, representing that the current block is encoded in the natural mode or the graphic mode.

Figure 11:
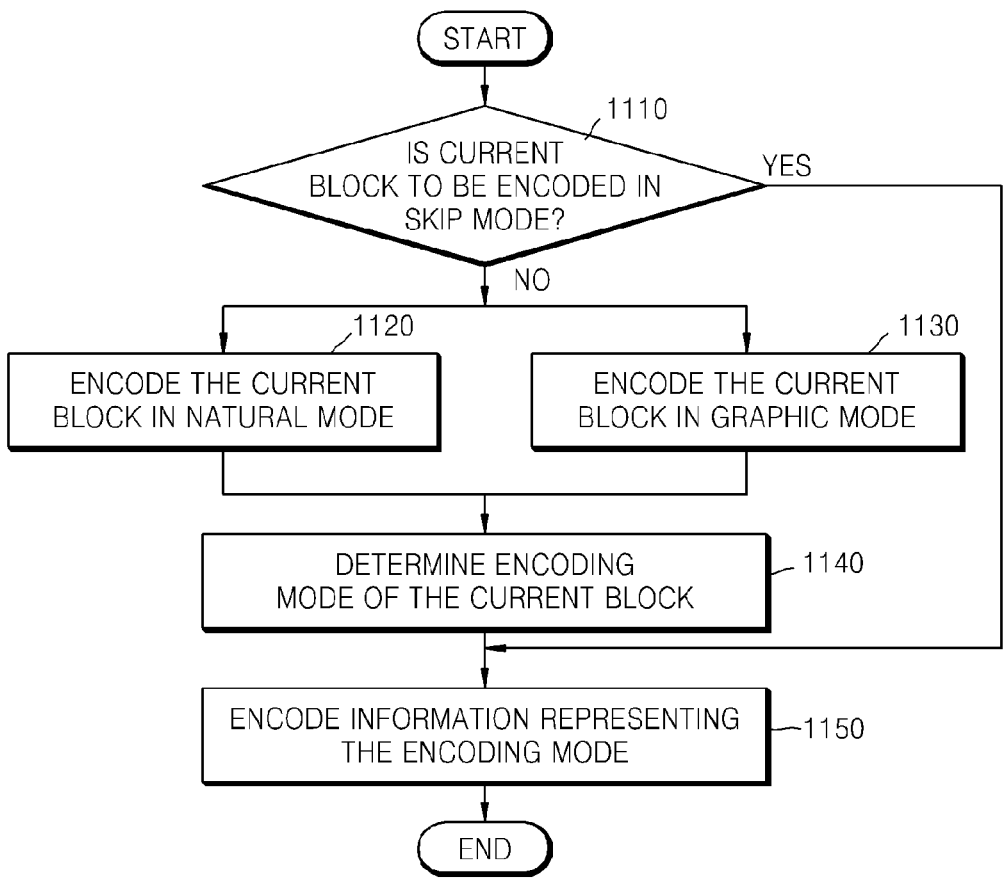
FIG. 11 is a flowchart of an image encoding method according to another exemplary embodiment.

FIG. 11 is a flowchart of an image encoding method according to another exemplary embodiment. Referring to FIG. 11, in operation 1110, the image encoding apparatus 100 or 700 illustrated in FIG. 1 or 7 determines whether to encode a current block in the skip mode. Operation 1110 may correspond to operation 1010 illustrated in FIG. 10.

If the encoding mode of the current block is not determined as the skip mode in operation 1110, the image encoding apparatus 100 or 700 separately encodes the current block in a natural mode and a graphic mode in operations 1120 and 1130.

In operation 1140, the image encoding apparatus 100 or 700 compares a result of encoding the current block in the natural mode to a result of encoding the current block in the graphic mode, and determines the encoding mode of the current block based on the comparison. The image encoding apparatus 100 or 700 calculates RD costs based on the results of encoding the current block in the natural mode and the graphic mode, and determines one of the natural mode and the graphic mode, which has a lower cost, as the encoding mode of the current block.

In operation 1150, the image encoding apparatus 100 or 700 encodes information representing the encoding mode of the current block. If the encoding mode of the current block is determined as the skip mode in operation 1110, the image encoding apparatus 100 or 700 encodes information, e.g., flag information, representing that the current block is encoded in the skip mode, instead of encoding pixel values of the current block. Also, if the encoding mode of the current block is not determined as the skip mode in operation 1110 and is determined as the natural mode or the graphic mode in operation 1140, then the image encoding apparatus 100 or 700 encodes information, e.g., flag information, representing that the current block is encoded in the natural mode or the graphic mode.

Figure 12:
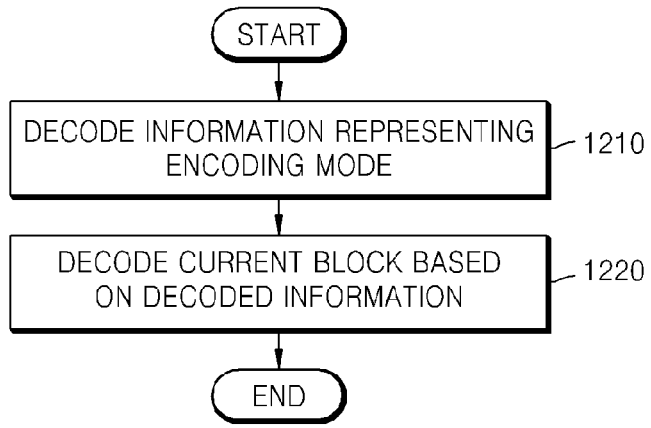
FIG. 12 is a flowchart of an image decoding method according to an exemplary embodiment.

FIG. 12 is a flowchart of an image decoding method according to an exemplary embodiment. Referring to FIG. 12, in operation 1210, the image decoding apparatus 800 or 900 illustrated in FIG. 8 or 9 decodes information representing an encoding mode of a current block, which is included in a bitstream. For example, the image decoding apparatus 800 or 900 decodes information representing whether the current block is encoded in the skip mode, the natural mode, or the graphic mode, by parsing the bitstream.

In operation 1220, the image decoding apparatus 800 or 900 decodes the current block based on the information decoded in operation 1210. If the decoded information represents that the current block is encoded in the skip mode, the image decoding apparatus 800 or 900 restores the current block based on a block that is identical or similar to the current block, i.e., a neighboring block decoded prior to the current block. If the decoded information represents that the current block is encoded in the natural mode or the graphic mode, the image decoding apparatus 800 or 900 restores the current block by inversely performing the encoding operations described above with reference to FIGS. 5 and 6A.

As described above, according to the exemplary embodiments, a current block that is identical or similar to a previously decoded block may be easily decoded by using pixel values of the previously decoded block.

While exemplary embodiments have been particularly shown and described with reference to the drawings, it will be understood by one of ordinary skill in the art that various changes in form and details may be made therein without departing from the spirit and scope of the inventive concept as defined by the following claims and their equivalents. An exemplary embodiment can also be embodied as computer readable codes on a computer readable recording medium. The computer readable recording medium is any data storage device that can store data which can be thereafter read by a computer system.

For example, at least one of the image encoding and decoding apparatuses illustrated in FIGS. 1, 4, 7, 8, and 9 may include a bus coupled to every unit of the apparatus, at least one processor connected to the bus, and memory connected to the bus so as to store commands, received messages, or generated messages and connected to the processor for executing the commands.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

What is claimed is:

1. An image decoding method performed by a processor, comprising:
   decoding information representing that a first block of an image has been encoded in a first mode; and
   reconstructing the first block enclosed in the first mode by setting pixel values of the first block to be identical to pixel values of a second block of the image, which is adjacent to the first block and has been decoded prior to the first block, based on the decoded information,
   wherein the first mode is a mode for encoding information representing that the pixel values of the first block is identical to the pixel value of the second block and has been encoded in the first mode, instead of encoding the pixel values of the first block.

2. The method of claim 1, wherein the second block has been decoded in the first mode, a second mode in which the second block is encoded by performing discrete cosine transformation (DCT), or a third mode in which the second block is encoded based on a plurality of bit planes of pixel values.

3. The method of claim 2, wherein the reconstructing the first block comprises setting the pixel values of the first block to be identical to the pixel values of the second block with respect to each of a predetermined number of color components.

4. The method of claim 3, wherein:
   the reconstructing the first block further comprises setting the pixel values of the first block to be identical to the pixel values of the second block which are disposed apart from the pixel values of the first block by differences between relative positions of the pixel values of the first block and the pixel values of the second block in an image data of the image, respectively;
   the image data is generated by arranging pixel values in an order in which a plurality of blocks of the image have been decoded and an order of the color components; and
   the differences between the relative positions of the pixel values of the first block and the pixel values of the second block, respectively, are equal to a product of the predetermined number of the color components and a number of pixel values included in one block of the image.

5. The method of claim 1, wherein the reconstructing the first block comprises setting all the pixel values of the first block to 0 when the first block is a first block of a current slice of the image.

6. The method of claim 5, wherein the setting all the pixel values of the first block comprises setting all the pixel values of the first block to 0 with respect to each of a predetermined number of color components, when the first block is the first block of the current slice.

7. The method of claim 1, wherein the decoding the information comprises parsing flag information representing that the first block has been encoded in the first mode.

8. A non-transitory computer-readable record medium having recorded thereon a computer program for executing the method of claim 1.

9. The method of claim 1 further comprising:
   if the decoded information indicates that the first block has been encoded in a second mode, decoding the first block by parsing direct current (DC) coefficients from among discrete cosine transformation (DCT) coefficients included in the bitstream, restoring a plurality of bit planes of alternating current (AC) coefficients from among the DCT coefficients using a bit plane-based decoding method, and performing inverse DCT on the restored AC coefficients and the parsed DC coefficients,
   wherein the second mode is a mode for encoding the first block of the image by performing DCT.

10. An image decoding apparatus comprising:
    a mode information decoder which decodes information representing that a first block of an image has been encoded in a first mode; and
    a skip mode decoder which reconstructs the first block encoded in the first mode by setting pixel values of the first block to be identical to pixel values of a second block of the image, which is adjacent to the first block and has been decoded prior to the first block, based on the decoded information,
    wherein the first mode is a mode for encoding information representing that the pixel value of the first block is identical to the second block and has been encoded in the first mode, instead of encoding the pixel values of the first block.

11. The apparatus of claim 10, wherein the second block has been decoded in the first mode, a second mode in which the second block is encoded by performing discrete cosine transformation (DCT), or a third mode in which the second block is encoded based on a plurality of bit planes of pixel values.

12. The apparatus of claim 11, wherein the skip mode decoder sets the pixel values of the first block to be identical to the pixel values of the second block with respect to each of a predetermined number of color components.

13. The apparatus of claim 12, wherein:
    the skip mode decoder sets the pixel values of the first block to be identical to the pixel values of the second block which are disposed apart from the pixel values of the first block by differences between relative positions of the pixel values of the first block and the pixel values of the second block in an image data of the image, respectively;
    the image data is generated by arranging pixel values in an order in which a plurality of blocks of the image have been decoded and an order of the color components; and
    the differences between the relative positions of the pixel values of the first block and the pixel values of the second block, respectively, are equal to a product of the predetermined number of the color components and a number of pixel values included in each block of the image.

14. The apparatus of claim 10, wherein the skip mode decoder sets all the pixel values of the first block to 0 when the first block is a first block of a current slice of the image.

15. The apparatus of claim 14, wherein the skip mode decoder sets all the pixel values of the first block to 0 with respect to each of a predetermined number of color components, when the first block is the first block of the current slice.

16. The apparatus of claim 10 further comprising a second mode decoder which, if the decoded information indicates that the first block has been encoded in the second mode, decodes the first block by parsing direct current (DC) coefficients from among discrete cosine transformation (DCT) coefficients included in the bitstream, restoring a plurality of bit planes of alternating current (AC) coefficients from among the DCT coefficients using a bit plane-based decoding method, and performing inverse DCT on the restored AC coefficients and the parsed DC coefficients,
wherein the second mode is a mode for encoding the first block of the image by performing DCT.

17. An image decoding method, the method comprising:
reconstructing a first block of an image by setting pixel values of the first block to be identical to pixel values of a second block of the image, which is adjacent to the first block and has been decoded prior to the first block when an encoding mode of the first block is a first mode,
wherein the first mode is a mode for encoding information representing that the pixel values of the first block is identical to the pixel values of the second block and has been encoded in the first mode, instead of encoding the pixel values of the first block.

18. A non-transitory computer-readable record medium having recorded thereon a computer program for executing the method of claim 17.

19. The method of claim 17 further comprising:
if the decoded information indicates that the first block has been encoded in a second mode, decoding the first block by parsing direct current (DC) coefficients from among discrete cosine transformation (DCT) coefficients included in the bitstream, restoring a plurality of bit planes of alternating current (AC) coefficients from among the DCT coefficients using a bit plane-based decoding method, and performing inverse DCT on the restored AC coefficients and the parsed DC coefficients,
wherein the second mode is a mode for encoding the first block of the image by performing DCT.

* * * * *